United States Patent [19]

Shiraishi

[11] Patent Number: 4,977,389

[45] Date of Patent: Dec. 11, 1990

[54] INDICATOR AND METHOD OF INDICATING TROUBLE

[75] Inventor: Yasuhiro Shiraishi, Zama, Japan

[73] Assignee: Nissan Motor Co., Ltd., Japan

[21] Appl. No.: 217,045

[22] Filed: Jul. 6, 1988

Related U.S. Application Data

[63] Continuation of Ser. No. 23,974, Mar. 11, 1987, abandoned, which is a continuation of Ser. No. 730,564, May 6, 1985, abandoned.

[30] Foreign Application Priority Data

May 8, 1984 [JP] Japan ............................. 59-67703[U]

[51] Int. Cl.$^5$ .............................................. B60Q 1/00
[52] U.S. Cl. .................................... 340/461; 340/459; 340/462
[58] Field of Search .................. 340/52 R, 52 F, 525, 340/286, 459, 461, 462

[56] References Cited

U.S. PATENT DOCUMENTS

| 4,194,199 | 3/1980 | Shepherd et al. | 340/52 F |
| 4,196,413 | 4/1980 | Sowa | 340/52 F |
| 4,277,772 | 7/1981 | Kastura et al. | 340/52 F |
| 4,498,075 | 2/1985 | Gaudio | 340/525 |
| 4,555,694 | 11/1985 | Yanagishima et al. | 340/52 F |

Primary Examiner—Donnie L. Crosland
Attorney, Agent, or Firm—Leydig, Voit & Mayer

[57] ABSTRACT

An automotive vehicle includes a plurality of indicators for indicating operating states of components of a system. A method of inducating fault or no-fault condition of the components derived from different possible causes, comprises causing the indicators to be placed into one of two different indicating statuses, to indicate by the combination statuses of the indicators the conditions of the components.

7 Claims, 6 Drawing Sheets

INDICATOR AND METHOD OF INDICATING TROUBLE

This application is a continuation of application Ser. No. 023,974, filed Mar. 11, 1987, now abandoned, which is a continuation of application Ser. No. 730,564, filed may 6, 1985, now abandoned.

BACKGROUND OF THE INVENTION

The present invention relates to an indicator and more particularly to a method of indicating different kinds of troubles.

Recently, numerous electronic components are installed in an automotive vehicle. Among these electronic components, those which are likely to be in trouble must be regularly checked as a safety measure. Conventionally, an indicator 2, mounted within an instrument panel, as shown in FIG. 1 has been used for trouble shooting.

According to this known method, the single indicator 2 is used to indicate the state of each of seven electronic components (or items) to be checked on time sharing basis. Referring to FIG. 2, a period of time T for one cycle is shared and divided into eight segments beginning with a period of time To for displaying initiation of each cyle of the check mode and seven equally divided segments T1 to T7 for indicating the state of seven different items one after another. To is set to 10 seconds and each of T1 to T7 is set to 2 seconds. The initiation of each cycle of the check mode is made by a pulse So which causes the indicator 2 to illuminate for 5 seconds. Upon lapse of five seconds after disappearence of the start indication pulse So, the result of checking of the seven items are displayed one after another with two seconds interval as shown by pulses S1 to S7 in FIG. 2. When the corresponding item (electronic component) works normally, the indicator 2 is illuminated for 0.1 second. When the item checked is in trouble, the indicator 2 is illuminated for 1 second. In the case of FIG. 2, the third and fifth items are in trouble.

With this known indicating method, the items must be counted to confirm which of the electronic components is in trouble. Besides, it takes time to confirm the result of checking all of the items.

SUMMARY OF THE INVENTION

The present invention aims at eliminating the above mentioned inconveniences encountered in the known indicator.

One aspect of the present invention is to provide an indicating method convenient for trouble shooting which is free from the above mentioned inconveniences.

According to the present invention, there is provided a method of indicating different kinds of troubles derived from different possible causes, comprising:

providing at least one indicator which can be placed into different indicating statuses;

causing said indicator to be placed into one of the different indicating statuses for informing one of the different kinds of troubles; and causing said indicator to be placed into other one of the different indicating statuses for informing other one of different kinds of troubles.

BRIEF DESCRIPTION OF THE DRAWINGS

FIG. 8 diagramatically illustrates the connection between the fault condition signals from the components and the indicators.

DESCRIPTION OF THE EMBODIMENTS

First embodiment according to the present invention is described in connection with FIGS. 3 to 6 of the accompanying drawings.

Figure 1:
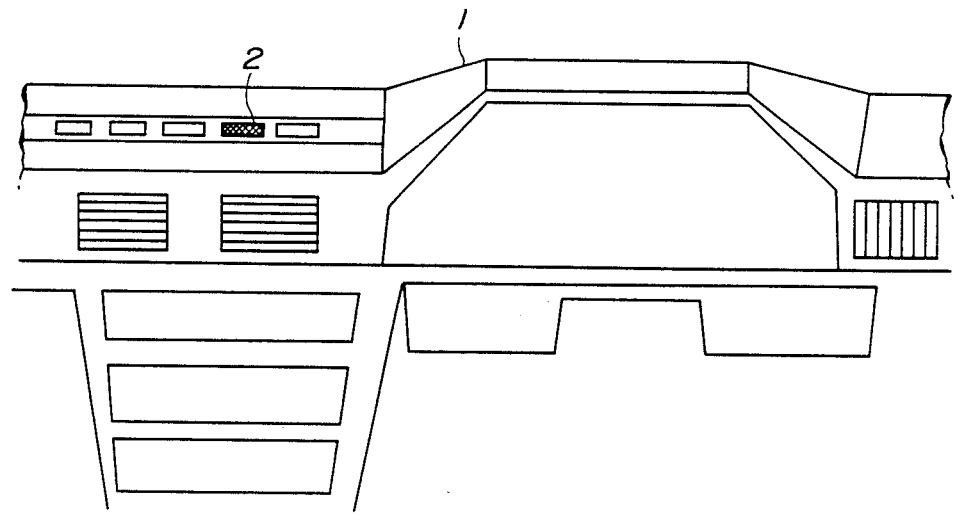
FIG. 1 is a known indicator discussed above.
Figure 2:
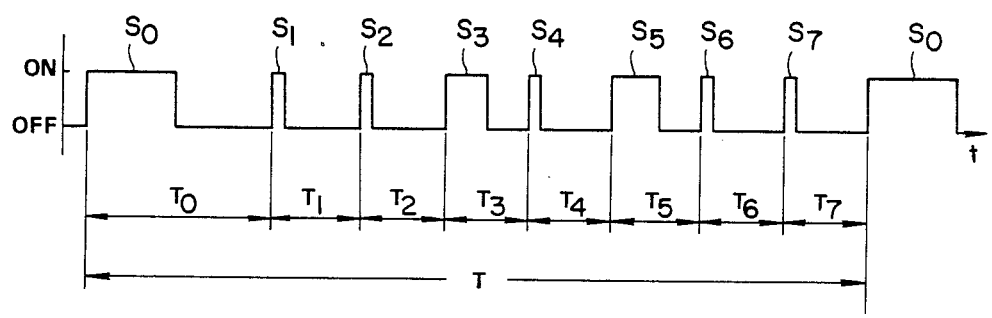
FIG. 2 is a timing diagram showing the operation of the known indicator.
Figure 3A:
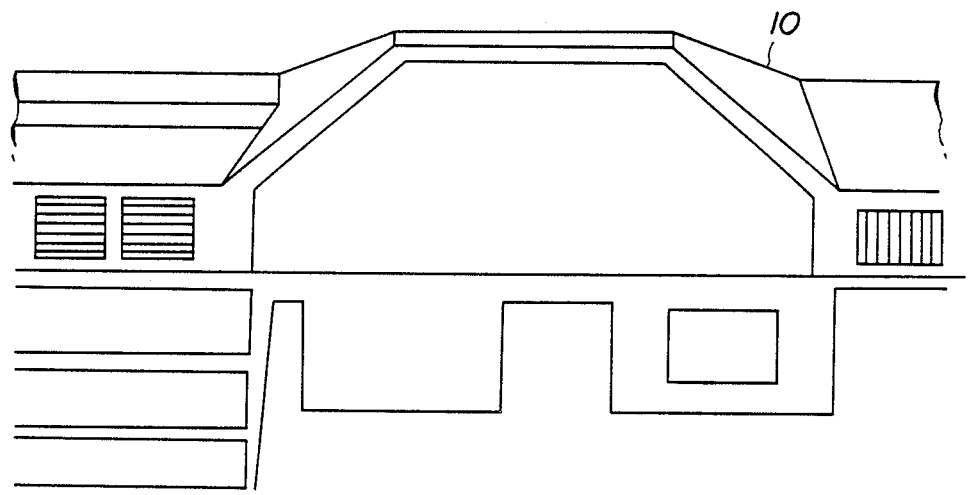
Fig 3 is a diagrammatic view of a vehicle's instrument panel with a control panel to which the present invention is applied.
Figure 3B:
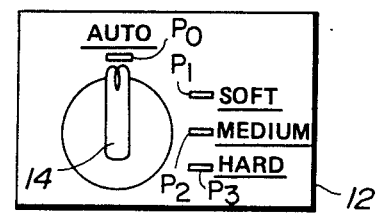

Referring to FIG. 3, there is shown an instrument panel 10 of an automotive vehicle that is provided with an electronically-controlled shock absorber system including a control panel 12 installed below the instrument panel 10. The control panel 12 includes a manually operable dial 14 so that the driver can manually select absorber settings "SOFT", "MEDIUM" and "HARD", or select "AUTO" to leave it to a CPU to adjust shock absorber characteristics automatically. In order to inform the setting selected, the control panel 12 has four indicators P1, P2, P3 and Po, each indicator being made of a light emitting diode. As shown in FIG. 3, the indicators P1, P2 and P3 are arranged to indicate "SOFT," "MEDIUM" and "HARD," respectively, and Po is used to indicate "AUTO." The electronically-controlled shock absorber system mentioned here is well known.

Figure 4:
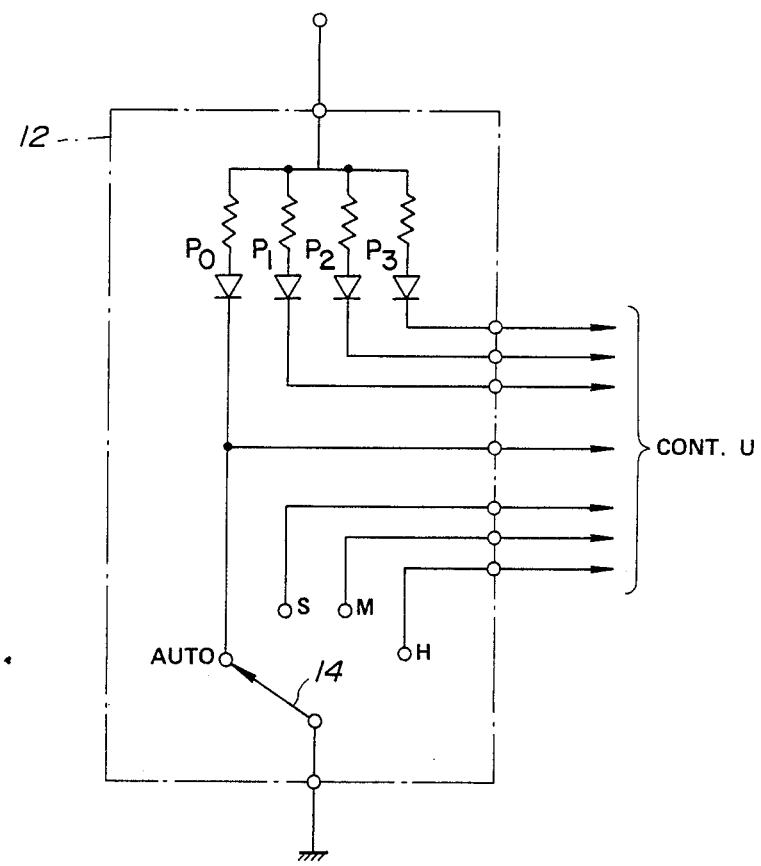
FIG. 4 is a schematic circuit diagram of a control unit as, associated with the control panel.

Referring to FIG. 4, a schematic circuit diagram shows how the indicators P1, P2, P3 and Po are connected with terminals selected by the dial 14. Each of the indicators P1, P2, P3 and Po is turned ON to emit light when the dial 14 is set to the corresponding terminal.

Figures 5A, 5B, 5C, 5D, 5E, 5F, 5G, 5H:
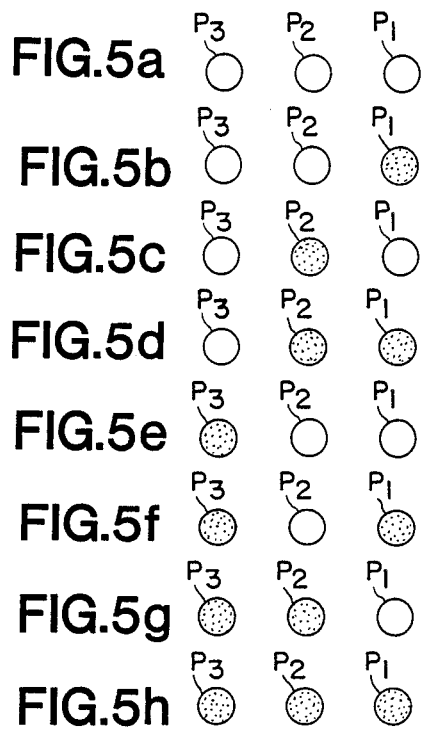
FIG. 5 shows operation modes of three indicators.

In this embodiment, referring also to FIGS. 5 and 8, a plurality of indicators herein shown as three indicators P1, P2 and P3 of the control panel 12 are also used to indicate seven different kinds of fault conditions derived from seven different possible causes. More particularly, seven different electronic components are monitored or checked to indicate which one of seven different electronic components has a fault condition and is in trouble. Referring to FIG. 5, the indicators P1, P2, and P3 are actuated in combination such that the statuses of the indicators indicate which of the indicators is working normally and which has a fault condition. As shown in FIG. 5(a), all of the indicators P1, P2 and P3 are turned OFF and thus they do not emit light. This combination of indicating statuses of three indicators P1, P2 and P3 is used to indicate that all of the electronic components is working normally. Referring to FIG. 5(b), the indicator P1 is turned ON to emit light with the other two indicators P2 and P3 left turned OFF to emit no light. This combination of statuses of the indicators P1, P2 and P3 is used to indicate that a first of the electronic components is in trouble. Referring to FIG. 5(c), the indicator P1 and P3 are turned OFF and P2 is turned ON to emit light. This combination of statuses of indicators is used to indicate that second of the electronic components is in trouble. FIGS. 5(d), 5(e), 5(f), 5(g) and 5(h) indicate the other five different combinations of statuses of indicators used to indicate that the other five different electronic components (third to seventh) have a fault condition, respectively. It will now be appreciated that eight different events are indicated by binary code. The indicators P1, P2 and P3 are controlled by a control unit (not shown) which controls electric current passing through the indicators P1, P2 and P3 after checking electronic component/components. This control unit may be easily designed using a CPU of a vehicle installed control unit. In this embodiment, each of the indicators P1, P2 and P3 is caused to be placed into two indicating statuses, one status where the indicator is turned ON to emit light, the other status where the indicator is turned OFF to emit no light. Therefore, with the three indicators P1, P2 and P3, eight different events can be indicated by binary code as shown in FIGS. 5(a) to 5(h). In each of these Figures, a white circle denotes that the indicator is turned OFF and emits no light, while a black circle denotes that the indicator is turned ON to emit light.

It will now be appreciated that the trouble shooting can be easily made at a glance. Besides, it can be easily confirmed that all of the electronic components work properly.

Figures 6A, 6B:
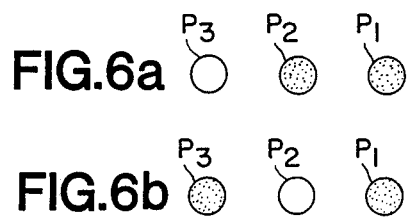
FIG. 6 shows two binary code displays appearing alternately.

Preferably, if a plurality of electronic components are in trouble at the same time, the corresponding combinations, for example, one shown in FIG. 5(d) and other one shown in FIG. 5(f), are alternately displayed. Assume now that the third and fifth electronic components are in trouble, binary code display as shown in FIG. 6(a) and that shown in FIG. 6(b) appear alternately.

Figures 7A, 7B, 7C, 7D, 7E, 7F, 7G, 7H, 7I:
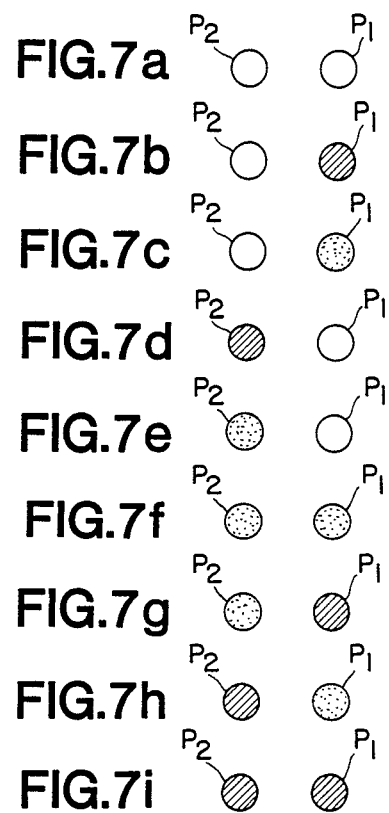
FIG. 7 shows operation modes of a second embodiment.

Referring to FIG. 7, a second embodiment is described. In this embodiment, only two indicators P1 and P2 of the control panel 12 is used to display different kinds of troubles with ternary code. Each of the indicator P1 and P2 is placed into three different indicating statuses, one status where the indicator is turned OFF and thus emits no light, second status wherein the indicator is turned ON to emit light, and third status where the indicator flashes. Therefore, with the two indicators P1 and P2, nine different events can be indicated as shown in FIGS. 7(a) to 7(i) using ternary code. Therefore, eight different electronic components can be monitored by corresponding first to eight electronic components to the eight different combinations of statuses of two indicators P1 and P2 as shown in FIGS. 7(b) to 7(i), respectively. In FIGS. 7(a) to 7(i), a shadowed circle denotes flashing state of the indicator.

Although in the first and second embodiments described above, the binary and ternary code are used, the number of indicating statuses of each indicator may be increased more than three. For example, controlling the electric current passing through an indicator makes it possible to control brightness to another level so as to provide the fourth indicating status of the indicator. Another measure to increase the number of indicating status of an indicator is to change the colour of illumination.

What is claimed is:

1. In an automotive vehicle having a plurality of indicator lights each having on and off indicating statuses for indicating operating states of a predetermined system installed in the automotive vehicle, a method of indicating fault conditions in a plurality of different components installed in the automotive vehicle utilizing the plurality of indicators of the predetermined system, the method comprising the steps of:
    assigning a predetermined identifying number to each of the components,
    providing condition signals representing the operating states of the components,
    producing coded signals from the condition signals representing a fault or a no-fault condition of each of the components according to the code used for generating the coded signals, and
    supplying said coded signals to the plurality of indicator lights to actuate the plurality of indicator lights in combination according to the code such that the on and off statuses of the indicator lights indicate in a coded form the number of a component in a fault or a no-fault condition.

2. A method according to claim 1 wherein a first plurality of indicators, when actuated in combination according to the code, represents the status of a second larger plurality of components.

3. The method according to claim 1 wherein the step of supplying said coded signals to a plurality of indicators causes a number of a component in a fault condition to be displayed in coded form and, when a plurality of components are in a fault condition,
    supplying said coded signals to the plurality of indicators to cause the numbers of the components in fault condition to be alternately displayed in coded form.

4. For an automotive vehicle having a plurality of indicator lights each having on and off indicating statuses for indicating operating states of a predetermined system installed in the automotive vehicle, a method of indicating a fault or a no-fault condition of each of predetermined components utilizing the plurality of indicator lights of the predetermined system, the method comprising the steps of:
    assigning a predetermined identifying number to each of the predetermined components,
    providing condition signals representing the operating states of the components,
    producing coded signals from the condition signals representing a fault or a no-fault condition of each of the components according to a binary code used for generating the coded signals,
    supplying said coded signals to actuate the indicator lights in combination according to the binary code such that the on and off statuses of the indicator lights indicate in a coded form the number of components in a fault or a no-fault condition.

5. A method of indicating fault conditions in a plurality of different components comprising the steps of:
    assigning a predetermined identifying number to each of the components,
    providing condition signals representing the operating states of the components,
    producing coded signals from the condition signals representing a fault or a no-fault condition of each of the components according to the code used for generating the coded signals, and
    supplying said coded signals to actuate a second smaller plurality of indicators to produce a single row of indicators having on and off statuses and cause the number of a component in a fault or no-fault condition to be displayed in coded form by the indicators and, when a plurality of components are in a fault condition, supplying said coded signals to actuate the second smaller plurality of indicators to cause the numbers of the components in fault condition to be alternately displayed in coded form.

6. In an automotive vehicle having a plurality of indicator lights each having on and off indicating statuses, the plurality of indicator lights assuming on indicating statuses for indicating different operating states of a predetermined system, respectively, which predetermined system is installed in the automotive vehicle, a method of indicating which one of a plurality of predetermined components installed in the automotive vehicle is in a fault condition, comprising the step of utilizing said plurality of indicator lights as a display by actuating said plurality of indicator lights in on and off manner to show one of different combinations of on and off statuses which identify said plurality of predetermined components, respectively, thereby showing which one of said plurality of predetermined components is in the fault condition.

7. In an automotive vehicle having a plurality of indicator lights each having on and off indicating statuses, the plurality of indicator lights assuming on indicating statuses for indicating different operating states of a predetermined system, respectively, which predetermined system is installed in the automotive vehicle, a method of indicating which one of a plurality of predetermined components installed in the automotive vehicle is in a fault condition, comprising the steps of:

assigning predetermined identifying combinations of on and off statuses of the indicator lights to the plurality of predetermined components, respectively;

detecting which one of said plurality of predetermined components is in the fault condition;

utilizing said plurality of indicating lights as a display by actuating said plurality of indicator lights in one of said plurality of predetermined identifying combinations in response to the result of said detecting step, thereby showing which one of the predetermined components is in the fault condition.

* * * * *